(12) United States Patent  
Batman et al.

(10) Patent No.: US 8,463,010 B2
(45) Date of Patent: Jun. 11, 2013

(54) SYSTEM AND METHOD FOR PROPAGATION OF SPINE LABELING

(75) Inventors: Sinan Batman, Pittsford, NY (US); Ron Ripperger, New Milford, CT (US); Rajendra R. Shirhatti, Stamford, CT (US)

(73) Assignees: FUJIFILM Corporation, Tokyo (JP); FUJIFILM Medical Systems USA, Inc., Stamford, CT (US)

( * ) Notice: Subject to any disclaimer, the term of this patent is extended or adjusted under 35 U.S.C. 154(b) by 276 days.

(21) Appl. No.: 13/131,643

(22) PCT Filed: Nov. 25, 2009

(86) PCT No.: PCT/US2009/065980
§ 371 (c)(1), (2), (4) Date: May 27, 2011

(87) PCT Pub. No.: WO2010/062989
PCT Pub. Date: Jun. 3, 2010

(65) Prior Publication Data
US 2011/0228995 A1  Sep. 22, 2011

Related U.S. Application Data

(60) Provisional application No. 61/118,582, filed on Nov. 28, 2008.

(51) Int. Cl.
*G06K 9/00* (2006.01)
(52) U.S. Cl.
USPC .................................. 382/128; 128/922; 378/4

(58) Field of Classification Search
USPC .. 382/100, 128, 129, 130, 131, 132; 128/922; 378/4–27; 707/661
See application file for complete search history.

(56) References Cited

U.S. PATENT DOCUMENTS 4,945,478 A   7/1990   Merickel et al.
5,413,106 A   5/1995   Fujita et al.
(Continued)

FOREIGN PATENT DOCUMENTS

JP   2009-003241   1/2009
JP   2009-207727   9/2009
(Continued)

OTHER PUBLICATIONS

Almeida Garcia, B, "International Search Report," mailed Sep. 15, 2010, for International Application No. PCT/US09/65980, Rijswijk, Netherlands.

(Continued)

*Primary Examiner* — Anand Bhatnagar
(74) *Attorney, Agent, or Firm* — Woods Oviatt Gilman LLP

(57) ABSTRACT

A system and method of labeling orthogonal or otherwise spatially related image views and related images is provided. The present invention provides automated progression for the labeling of vertebral and inter-vertebral regions, propagation of labels between views and images within a series, centering of label regions relative to the spine, circular lists of pre-defined labels, and label displays for individual slices of an orthogonal or axial view as a user scrolls through the plurality of image slices of the given view. In a further aspect, the present invention provides automated labeling of vertebral and inter-vertebral regions when a user provides labels for the adjacent two inter-vertebral or vertebral regions.

15 Claims, 9 Drawing Sheets

U.S. PATENT DOCUMENTS

| | | | | |
|---|---|---|---|---|
| 5,709,206 | A | | 1/1998 | Teboul |
| 5,803,914 | A | * | 9/1998 | Ryals et al. ............... 600/407 |
| 5,986,662 | A | * | 11/1999 | Argiro et al. ............... 345/424 |
| 5,999,840 | A | | 12/1999 | Grimson et al. |
| 6,625,303 | B1 | | 9/2003 | Young et al. |
| 6,948,126 | B2 | * | 9/2005 | Malamud et al. ............ 715/715 |
| 7,046,830 | B2 | * | 5/2006 | Gerard et al. ............... 382/128 |
| 7,129,946 | B2 | * | 10/2006 | Ditt et al. .................... 345/427 |
| 7,206,462 | B1 | | 4/2007 | Betke et al. |
| 7,221,787 | B2 | | 5/2007 | Luo et al. |
| 7,277,564 | B2 | * | 10/2007 | Yarger et al. ............... 382/128 |
| 7,447,343 | B2 | * | 11/2008 | Barfuss et al. .............. 382/128 |
| 7,574,024 | B2 | | 8/2009 | Bitter et al. |
| 2003/0142123 | A1 | * | 7/2003 | Malamud et al. ............ 345/715 |
| 2004/0062358 | A1 | | 4/2004 | Lang et al. |
| 2005/0111715 | A1 | | 5/2005 | Yoo et al. |
| 2007/0081712 | A1 | * | 4/2007 | Huang et al. ................ 382/128 |
| 2007/0127799 | A1 | | 6/2007 | Reisman et al. |
| 2007/0223799 | A1 | | 9/2007 | Weiss |
| 2007/0280561 | A1 | | 12/2007 | Morita et al. |
| 2008/0044069 | A1 | | 2/2008 | DuGal |
| 2008/0075348 | A1 | | 3/2008 | Rappaport et al. |
| 2008/0118139 | A1 | | 5/2008 | Huo et al. |
| 2008/0132784 | A1 | * | 6/2008 | Porat et al. ................. 600/426 |
| 2008/0137932 | A1 | | 6/2008 | Shen et al. |
| 2009/0202122 | A1 | | 8/2009 | Wang |
| 2009/0245608 | A1 | | 10/2009 | Wan |
| 2009/0262998 | A1 | | 10/2009 | Wang et al. |
| 2010/0150418 | A1 | | 6/2010 | Moriya et al. |
| 2010/0177945 | A1 | * | 7/2010 | Moriya ........................ 382/131 |

FOREIGN PATENT DOCUMENTS

| | | |
|---|---|---|
| JP | 2009-207886 | 9/2009 |
| JP | 2009-240617 | 10/2009 |
| JP | 2009-254600 | 11/2009 |
| WO | WO 2009/073185 | 6/2009 |

OTHER PUBLICATIONS

Almeida Garcia, B, "Written Opinon of the International Searching Authority," Sep. 15, 2010, for International Application No. PCT/US09/65980, Rijswijk, Netherlands.

Falcao, A., et al, "A 3D generalization of user-steered live-wire segmentation," Medical Image Analysis, Oxford University Press, Oxford, GB, vol. 4, No. 4, Dec. 1, 2000.

Shen, Hong,et al, "Localized Priors for the Precise Segmentation of Individual Vertebras from CT Volume Data," Medical Image Computing and Computer-Assisted Intervention, 2008.

* cited by examiner ism and method for propagation of spine labeling

CROSS-REFERENCE TO RELATED APPLICATIONS

This application is a National Stage filing under 35 U.S.C. §371 of International Application No. PCT/US2009/065980, filed Nov. 25, 2009, which in turn claims the benefit of U.S. Patent Application No. 61/118,582, filed Nov. 28, 2008, both of which are hereby incorporated by reference in their entirety.

FIELD OF THE INVENTION

The present invention is directed in general to imaging technologies and more particularly to medical imaging and picture archiving and communication systems (PACS) having an image display wherein labeling of the image is desired. A system and method are provided to ease and improve labeling of images, particularly spinal column images. More specifically, a system and method are provided for the automated labeling of spine images, alignment of such labels and the propagation of the labels between different views of the image, such that movement through orthogonal views of the images or slices of the subject, will display appropriate labels. Users are able to quickly label images and more accurately and consistently identify various regions of an image irrespective of the viewing plane.

BACKGROUND OF THE INVENTION

In medical imaging, picture archiving and communication systems (PACS) are a combination of computers and/or networks dedicated to the storage, retrieval, presentation and distribution of images. While images may be stored in a variety of formats, the most common format for image storage is Digital Imaging and Communications in Medicine (DICOM). DICOM is a standard in which radiographic images and associated meta-data are communicated to the PACS system from imaging modalities for interaction by end-user medical personnel.

PACS display textual and graphical medical information that are associated with image attributes. Some of this information is received from DICOM and some is generated within the PACS as annotations that are associated with the images or measurements linked to anatomical regions of interest or markers that are produced by third party systems, such as Computer Aided Detection (CAD) applications. The DICOM standard recently introduced support for Structured Reports (SR) that can include CAD findings and GSPS (Grayscale SoftCopy Presentation State) non-image objects that are necessary to reproduce the same visualization of an image if displayed at two disparate PACS systems. Not all annotations are covered under the GSPS umbrella and often these attributes are displayed as static image overlays that can be turned on or off, based on the viewer's preference.

For example, certain attributes that are related to image processing are displayed as alphanumeric annotations that are associated with the rendering of a particular image. The use of an image as a diagnostic or analytical tool generally requires that images be labeled by appropriate medical personnel. The labeling of images is accomplished by the annotation of points or regions, on a displayed image, with a descriptor such as a label. The descriptor may be user provided such as manually typed text/numbers or be predefined alphanumeric strings that are selectable by the user. All users are thus able to identify image regions as a result of these labels.

Since an object or body part of interest will typically have multiple images taken or generated from different perspectives or views (i.e. sagittal, transverse, orthogonal, curved MPR, etc.), it would be beneficial for the labels to appear on the various views of the image irrespective of the view that is being displayed. The labels thus provide a reference point between the displayed images. More importantly, it would be beneficial for the label of a particular region to be propagated to all views and all images of that region within a given system.

For example, in the area of spine labeling, text annotations are provided in proximity to vertebral and inter-vetebral regions of an image of a spine, to serve as points of reference for any user viewing the image. In the imaging process for the spine, a first image may obtained in the sagittal plane, a second image or series of images may be obtained in the orthogonal plane and a third series of other images may be taken in the axial plane. The label for any particular vertebrae in the first image is also required on the second and third series of images. Traditionally, this labeling process is manual in nature. That is, a user with the aid of a mouse or other pointing device locates a vertebra in the first image, and then locates other instances of that vertebra in the second and third series of images. This annotation process is very time consuming. Furthermore, this process is prone to errors as the labels must be consistently placed in each of the images within each of the series of images.

To overcome some of the deficiencies described above, some systems have attempted to minimize the amount of manual effort that may be required to propagate spine labels between the different images and views. However, these systems suffer from drawbacks of their own. These solutions utilize a single point label in one view of an image to propagate that label to an orthogonal view of the image, such as by finding the single point of intersection of the orthogonal plane and the label point. One of many disadvantages and draw backs to this method is the fact that such a system would not allow a continuous display of labels as a user moves through the various slices of an orthogonal view since only the single slice that intersects the point on the sagittal view would have a label. Another disadvantage lies in the issue of accuracy in of the labeling of an orthogonal or axial slice. Since the plane of the axial slice may not exactly intersect the labeled point on the sagittal view, some approximation of the proximity of the axial slice to the intersection point is required. This aspect would not only introduce errors in labeling, but may also confuse or mislead a user who may be expecting a label as a certain axial image view is displayed.

What is needed is an intuitive and quick method for labeling images that transcends the problems highlighted above and provides a simplified yet efficient and reliable identification of image regions irrespective of the view that is displayed. In other words, a system that avoids the tedium of manual labeling, propagates labels to the various views and various related images in a series. The present invention fills these needs as well as other needs.

SUMMARY OF THE INVENTION

The present invention is directed to a system and method of labeling orthogonal or otherwise spatially related image views and related images. The present invention provides automated progression for the labeling of vertebral and intervertebral regions, propagation of labels between views and images within a series, centering of label regions relative to the spine, circular lists of predefined labels, and label displays for individual slices of an orthogonal or axial view as a user scrolls through the plurality of image slices of the given view.

The present invention also provides automated labeling of vertebral and inter-vertebral regions when a user provides labels for the adjacent two, inter-vertebral or vertebral, regions.

BRIEF DESCRIPTION OF THE DRAWINGS

The above-mentioned and other features and advantages of this invention, and the manner of attaining them, will become apparent and be better understood by reference to the following description of the invention in conjunction with the accompanying drawing, wherein.

DETAILED DESCRIPTION OF THE INVENTION

Generally, the system and methods described herein for creating and implementing the labels may be implemented in hardware, software or a combination thereof. This document is organized as follows. In the first section, an overview of the techniques and implementation as provided by an exemplary PACS system in accordance with the present invention are provided and described. In the next section, an exemplary implementation of particular features of the present invention for specifying, centering and propagating labels to various images is discussed. Following this, other aspects of the invention as they pertain to ease of use and tools of convenience, including automated and semi-automated labeling of images are discussed. Finally, an exemplary computer environment for the implementation and use of the invention is described.

The present invention provides a system and methodology for labeling vertebral and inter-vertebral regions of spinal images with image annotations. Although the following discussions and the present invention are described in relation to a biological imaging system (i.e., PACS), it should be understood that the invention is also applicable to other information/imaging technologies and systems and imaging of other anatomical body parts.

An example is modality workstation which enables proper manipulation, preparation and clean-up of acquired image series before examination by the radiologists. Another example is surgery planning or Orthopedic templating software. Such systems include those wherein image manipulation, image attributes and features of an imaging system are required to be intuitively and easily marked or identified, including non-medical systems, visual analysis and diagnostic tools, and other visual user interface environments. Further, the present invention is described with reference to orthogonal and planar views, however, the system and method of the present invention is equally applicable to non-orthogonal views and/or non planar views. Additionally, this specification describes labeling from the sagittal view for illustrative purposes only. The use of one or more other views is within the scope of the present invention.

Figure 1A:
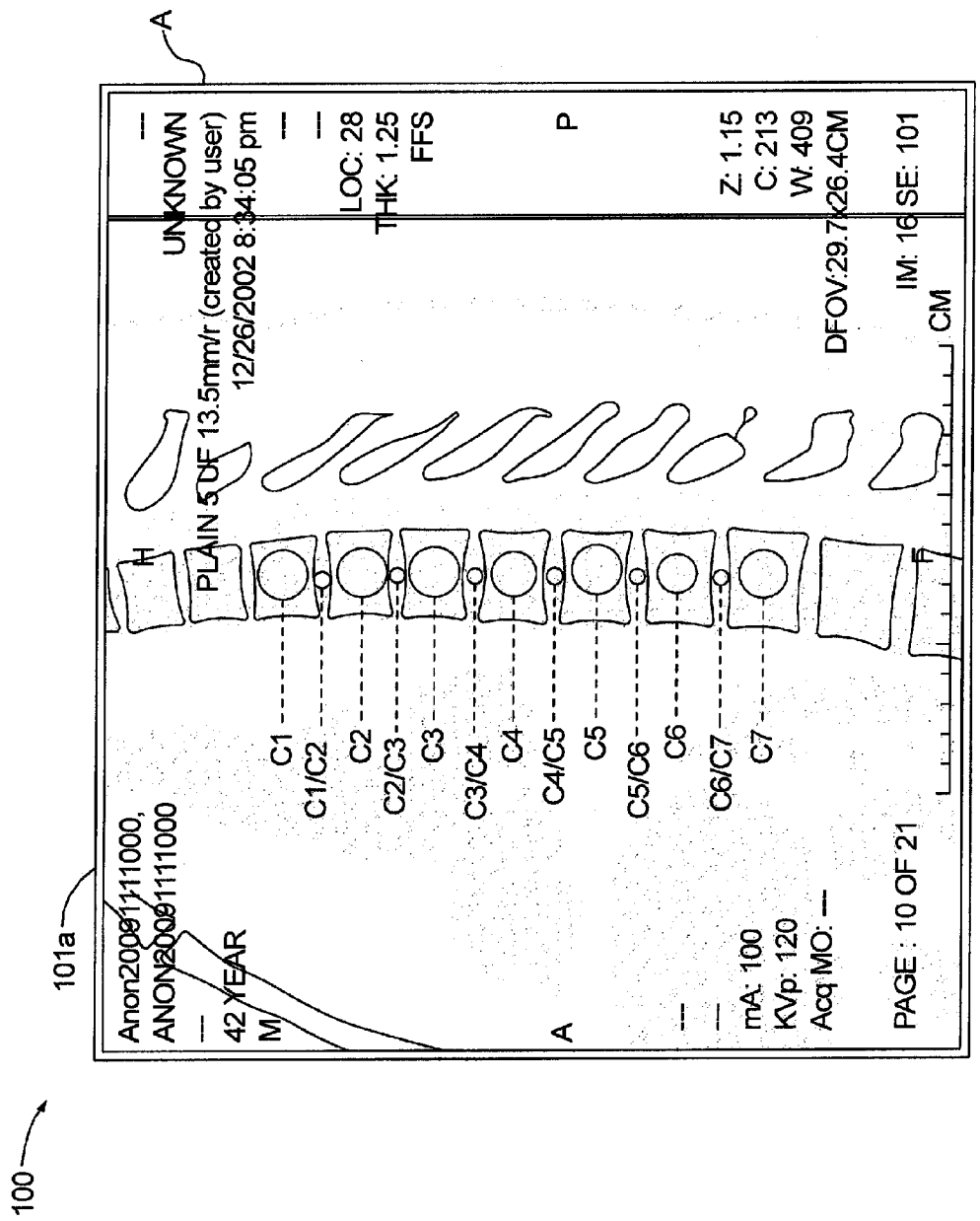
FIGS. 1A, 1B and 1C are line drawings of images that may be simultaneously displayed by a PACS in a single window that may be divided into at least three regions.
Figure 1B:
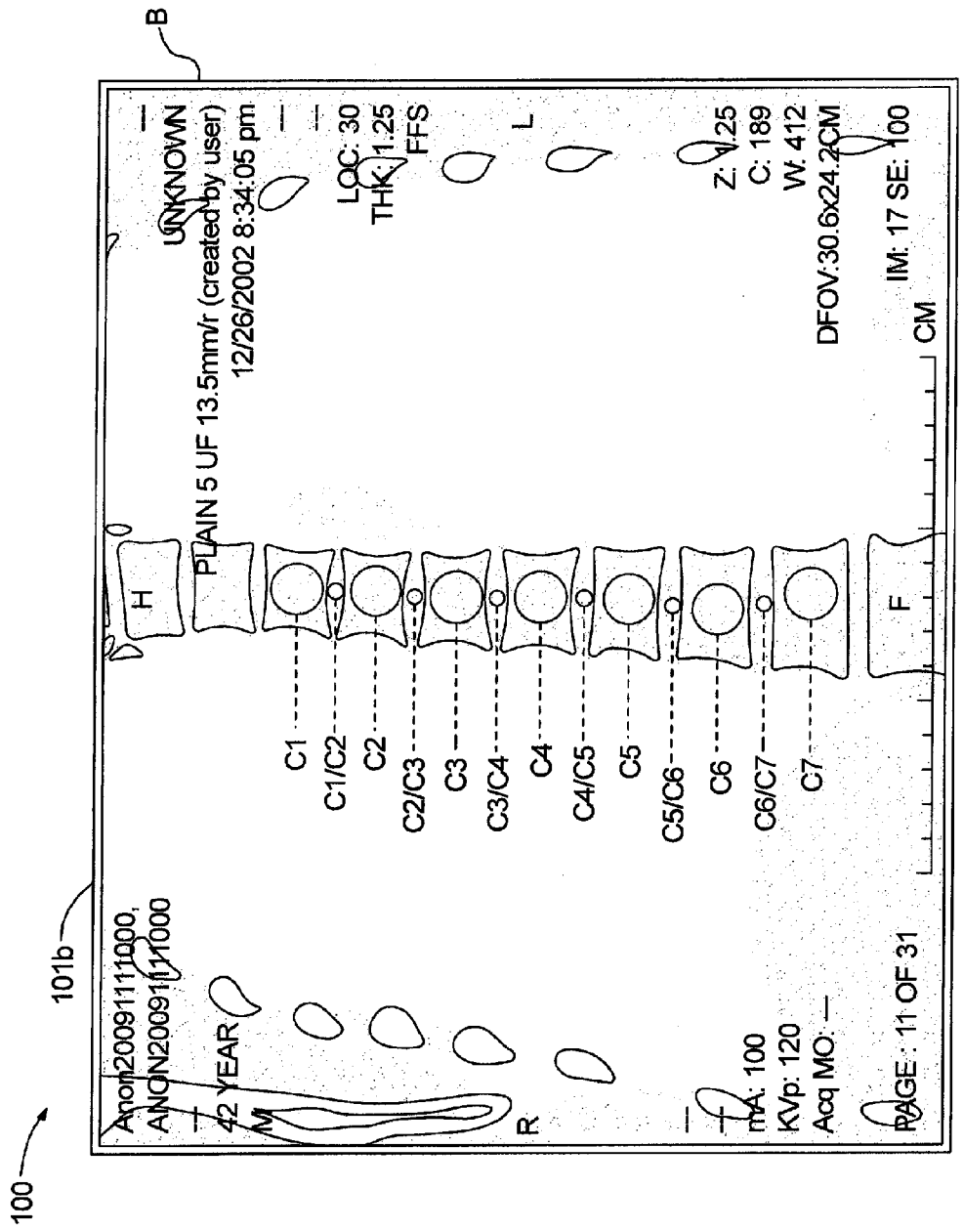
Figure 1C:
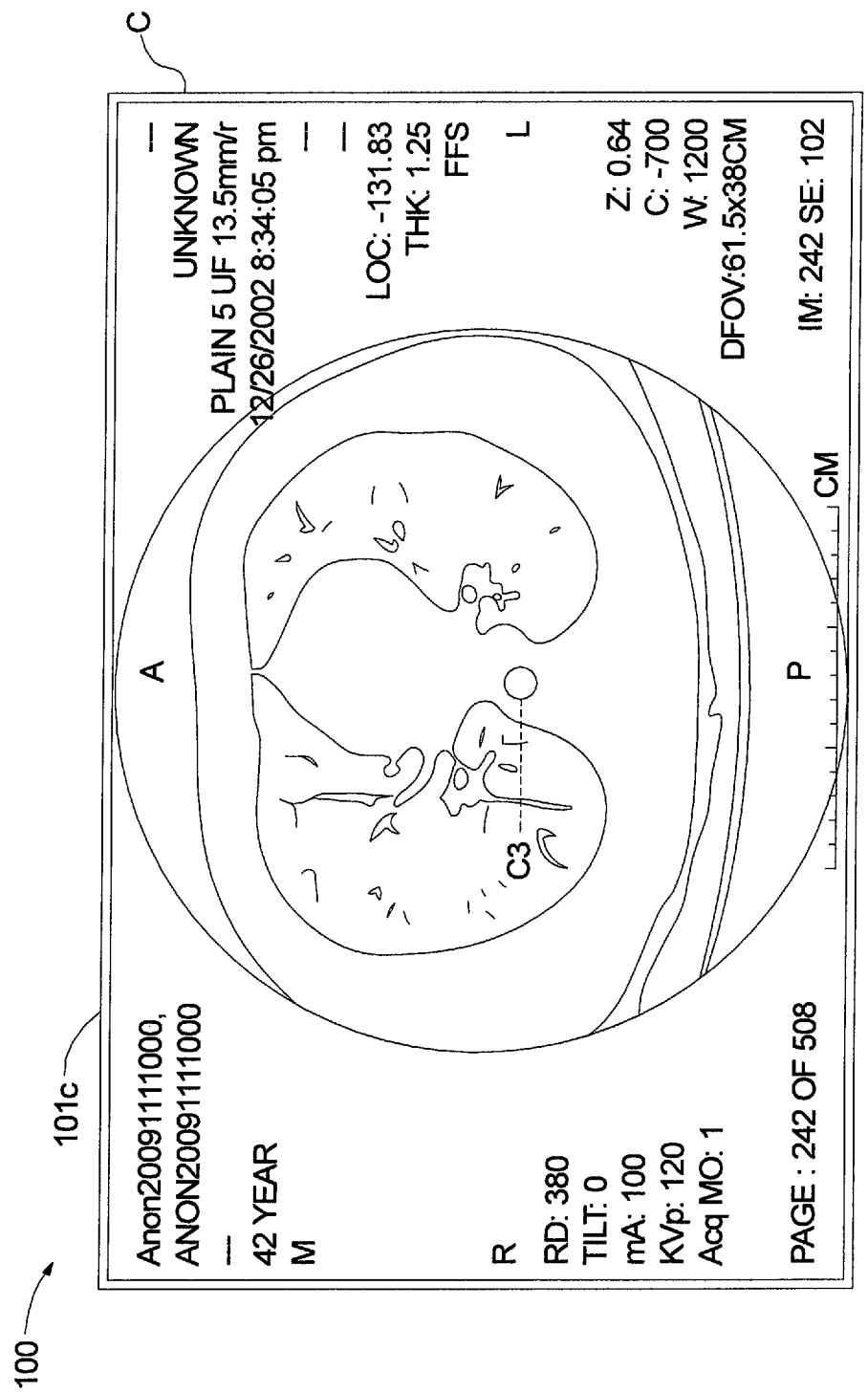

Referring to FIGS. 1A, 1B and 1C, an imaging system such as a PACS system provides in one aspect a window display 100 of images 101a, 101b, 101c to enable an end user such as a technician, radiologist or other qualified personnel, to review, analyze or diagnose a patient's condition. Generally, one or more images of a target area of the body are captured by an imaging device such as an X-ray device, computer-tomography (CT) scanner, or magnetic resonance imaging (MRI) device. In order to provide a picture of the target, images of the target are acquired from multiple viewing planes. The images are usually taken in orthogonal planes and are typically presented to the user in the single viewing window 100, wherein images 101a, 101b, 101c may be simultaneously displayed. The window 100 may be split into regions A, B, and C for enabling the simultaneous display of the multi-view images 101a, 101b, 101c. For example, region A, displays an image taken along the sagittal plane of a subject body. Region B, displays an image taken in the coronal plane of the subject body, and region C displays an axial plane view. As would be appreciated by one skilled in the art, the various image displays of the window 100 may be part of a series of images acquired from a particular view plane. For example, the displayed axial view image of region C, is an image of a single slice in a series of multiple slices and images taken in the axial plane throughout the length of the subject body.

In order to facilitate reference and identification of the parts of an image for the purpose of diagnosis or analysis of the subject, the various parts of the images of the window 100 need to be labeled. More specifically, and as shown in regions A, B, and C, the labels provide a definitive reference to particular regions of the displayed spine. The labels are stored as annotative overlays of the image, thus allowing later review and reference when the image is later displayed or otherwise presented. The present invention provides an improved and efficient system and method for labeling the images in the various regions A, B, and C. It should be noted that the labels are volumetric. The displayed rectangle or circle is actually the cross section of a label volume such as a rectangular prism or a sphere that gets placed in the 3D volume. The volume is then aligned with the center of the vertebrae using projection on the primal line that results from a spine detection algorithm that is described in detail further in this specification. Alternatively, the user may manually define the vertebral center. It should be noted that the views of the 3D volume are not always orthogonal and need not be planar. A curved multi-planar reconstruction view may be utilized.

Figure 2:
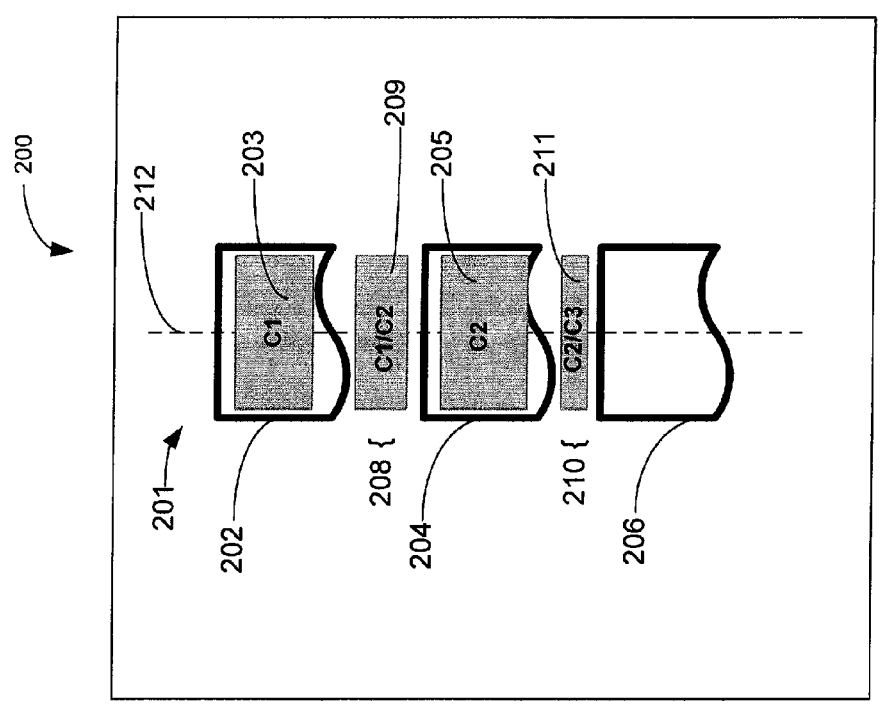
FIG. 2 is a block diagram illustrating vertebral and inter-vertebral regions of a spine along with the labeling of those regions.

In operation, and as best described with reference to the block diagram 200 of FIG. 2, the present invention provides an improved and efficient method to label a vertebral column 201. As shown, the vertebral column 201 includes vertebrae 202, 204, 206 and inter-vertebral discs 208, 210. In order to label the various section of the spinal column 201, a user with the aid of a pointing device, such as a mouse with a thumb wheel, is able to switch into a labeling mode. In the labeling mode, either a single identifier or a label is displayed. Alternatively, a list of multiple identifiers may be displayed for selection by the user. In either scenario, the user is able to dial through the available labels to a desired label for tagging or otherwise identifying an image item.

In the case labeling of spinal vertebrae and inter-vertebrae, the presented list of labels is configurable by the user to include one or all of the regional labels for the spinal column namely, cervical, thoracic, lumbar, and sacral regions (C1-C7, T1-T12, L1-L5 and S1-S5). The user may also select whether or not the presented label list will include both vertebral and inter-vertebral labels or just one or the other. These selectable options increase the efficiency and speed with which the user may locate labels of interest. Once a desired label is located with the mouse wheel or right or left mouse click and drag based on the configuration, the user is able to click on the relevant section of the image and place the label (i.e., the vertebra or disc), which in the case of the present illustration and discussion is vertebra 202.

Generally, according to the system and method of the present invention, the mouse click results in a volumetric label based on a spherical, rectangular, or similar region 203 being overlaid on the image of the spinal column 201 in the user selected section of the image (i.e., on a vertebra 202) along with the proper label, such as C1. The volumetric region 203 defines a 3D label region on the target object for the boundaries of the vertebra 202 rather than merely a label point within the vertebra 202. By default configuration, in an embodiment of the present invention, when a user selects a vertebra as the target for a label, a volumetric marker having a dimension of approximately radius (a) is placed on the vertebra. Conversely, when a disc is selected, a volumetric marker having a radius of approximately a/2 is overlayed on the disc. It is implicit that the dimensions of these markers may be a function of the anatomy being labeled, the level of magnification, and resolution of the image. Notwithstanding this, in a further embodiment of the invention, the dimensions and positions of the label region (i.e., the rectangle), is adjustable and sizeable by the user as required. Subsequent sections of the spinal column may be marked and labeled as shown in FIG. 2.

Using the mouse or other user interface device, the user is able to identify and mark the different parts of the spinal column 201. The vertebra 202 is marked by a region 203 having a label C1, vertebra 204 is marked by region 205 and a label C2. The inter-vertebra disc 208 is similarly marked by region 209 and labeled C1/C2 and inter-vertebra disc 210 is marked by regions 211 and labeled C2/C3. In a further embodiment of the present invention, an axis or center line 212 of the spinal column is algorithmically determined and the various label regions 203, 205, 209 and 211 are centered about the center line 212. This feature enables a well defined volume of the vertebrae or inter-vertebrae to be ascertained and accordingly identified with each label.

Figure 3:
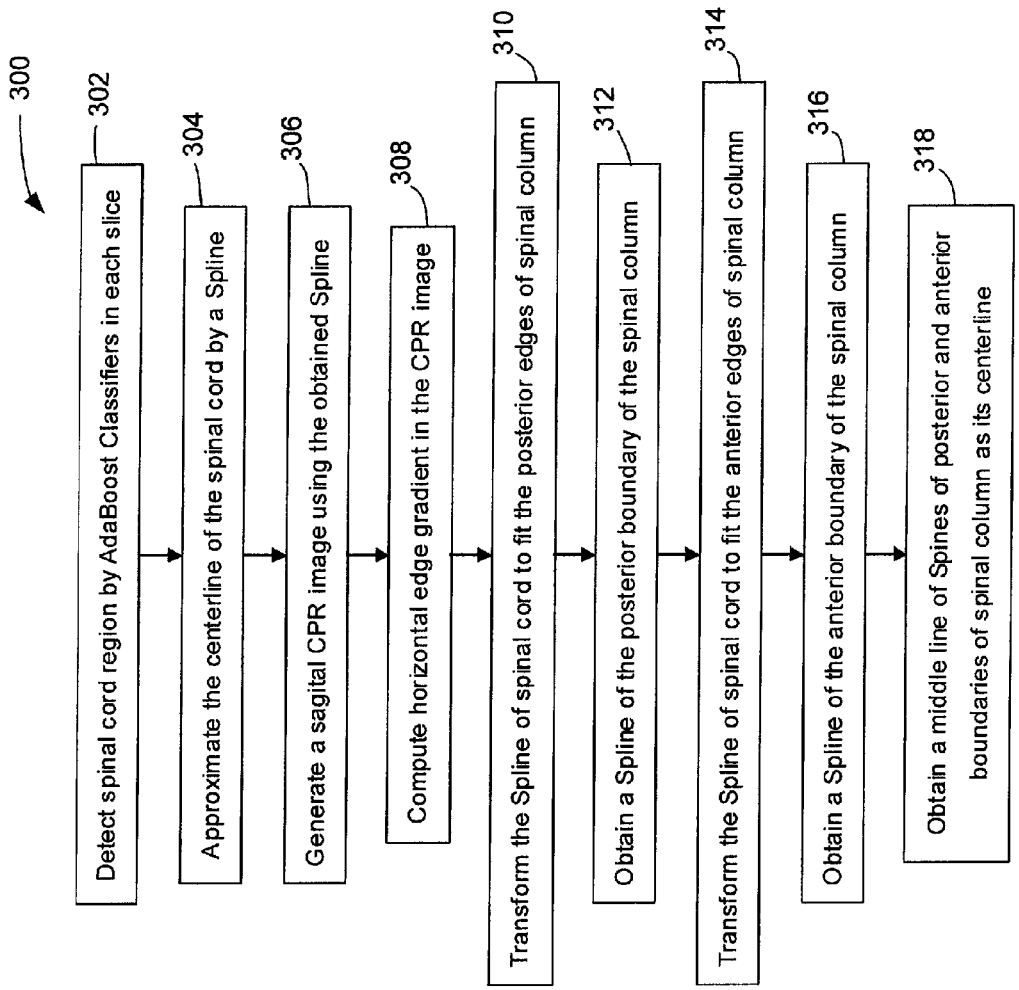
FIG. 3 is a flow diagram illustrating the steps for aligning the label regions of the spine according to the present invention.

The center line 212 is determined by application of logic illustrated in the flow diagram of FIG. 3. The present invention, importantly, utilizes an algorithm to detect the approximate location of the center of the spinal cord and from there the central axis of each vertebrae. This location is used to anchor the manual volume label provided by a user, back to where it really belongs. At step 302, a spinal cord region is detected utilizing AdaBoost classifiers in each slice. As would be appreciated by one skilled in the art, other methods for defining a spinal location may also be employed without departing from the spirit and scope of the present invention. Next, an approximation of the center line is made by a spline, at step 304. Following this, a sagittal Curved Planar Reformatted (CPR) image is generated utilizing the aforementioned spline, at step 306. Horizontal edge gradients are computed in the CPR at step 308. However, it should be understood that it is not necessary to generate the CPR to take advantage of the present invention. Using the CPR would ensure that the spine will be visible at the vertebrae centers, and that the user will be able to label each vertebrae without the need to adjust slice position to best place the labels. This is especially helpful for labeling a vertebrae for a scoliosis patient or a patient that has severe arthritis related spinal deformation. However, even in the absence of the CPR, the location of vertebral axis acts like a reference axis to properly place labels created in a particular view (typically sagittal or coronal), to their proper 3D location.

Next, the spline of the spinal cord is transformed to fit the posterior edges of the spinal column, at step 310. A spline of the posterior boundary of the spinal column is obtained at step 312. The spline of the spinal cord is transformed to fit the anterior edges of the spinal column, at step 314. Following this, a spline of the anterior boundary of the spinal column is obtained at step 316. Finally, at step 318, a middle line of the splines of the posterior and anterior boundaries of the spinal column are determined to be the centerline.

In an embodiment of the present invention, the automated algorithm that provides the vertebral axis also provides a volume in the shape of a cylindrical cube that closely surrounds and envelops the spinal column, thus providing further gains in user productivity.

The present invention implements a propagation of labels from one image or view to all associated views and images in a series. Returning for a moment to the window 100 of FIG. 1. After an image in the sagittal view, such as shown in region A, has been successfully labeled, the present invention provides for the propagation of the labeling to the coronal view image shown in region B as well as to the axial view shown in region C. Importantly, and as shown, the present invention labels a volume of the vertebra. In effect, the sagittal view of region A displays the x, y area of the labeled volume region and the coronal view of region B displays the y, z area of the labeled volume region.

It should be noted that labels in the present invention are propagated to the correct 3D location. More specifically, in two-dimensional PACS, when the user places a selection sphere marker on the coronal view for example, an exact three-dimensional location is not defined. There is high likelihood that when viewed from the axial slice the marker may be outside the vertebrae. The present invention ensures that by the using the spinal line, the labels are moved automatically in their current three-dimensional location without requiring the user to explicitly go to the axial and coronal views to adjust the placement.

As would be appreciated by one skilled in the art, there are multiple ways to label the various views or images. The spinal line may be utilized to do CPR and label the image. The image navigation in two-dimension can be constrained such that it resides on the spinal column thereby making the labeling easier. Alternatively, labels could be moved to their correct three-dimensional location without any modification to image navigation or the requirement for CPR. The latter is preferred method to introduce the feature of the present invention in a native two dimensional PACS. This feature enables faster labeling from the users perspective, particularly since the user can be sloppy and move faster during the labeling process, as the algorithm will correct for it. For example, while on an axial slice, the user can place the label of vertebrae and the sphere will be automatically centered around the spinal axis by the present invention. In coronal and sagittal views the user can place the label off the spine along a perpendicular line to the spinal column and the label will be moved back automatically to the spinal line.

Figure 4:
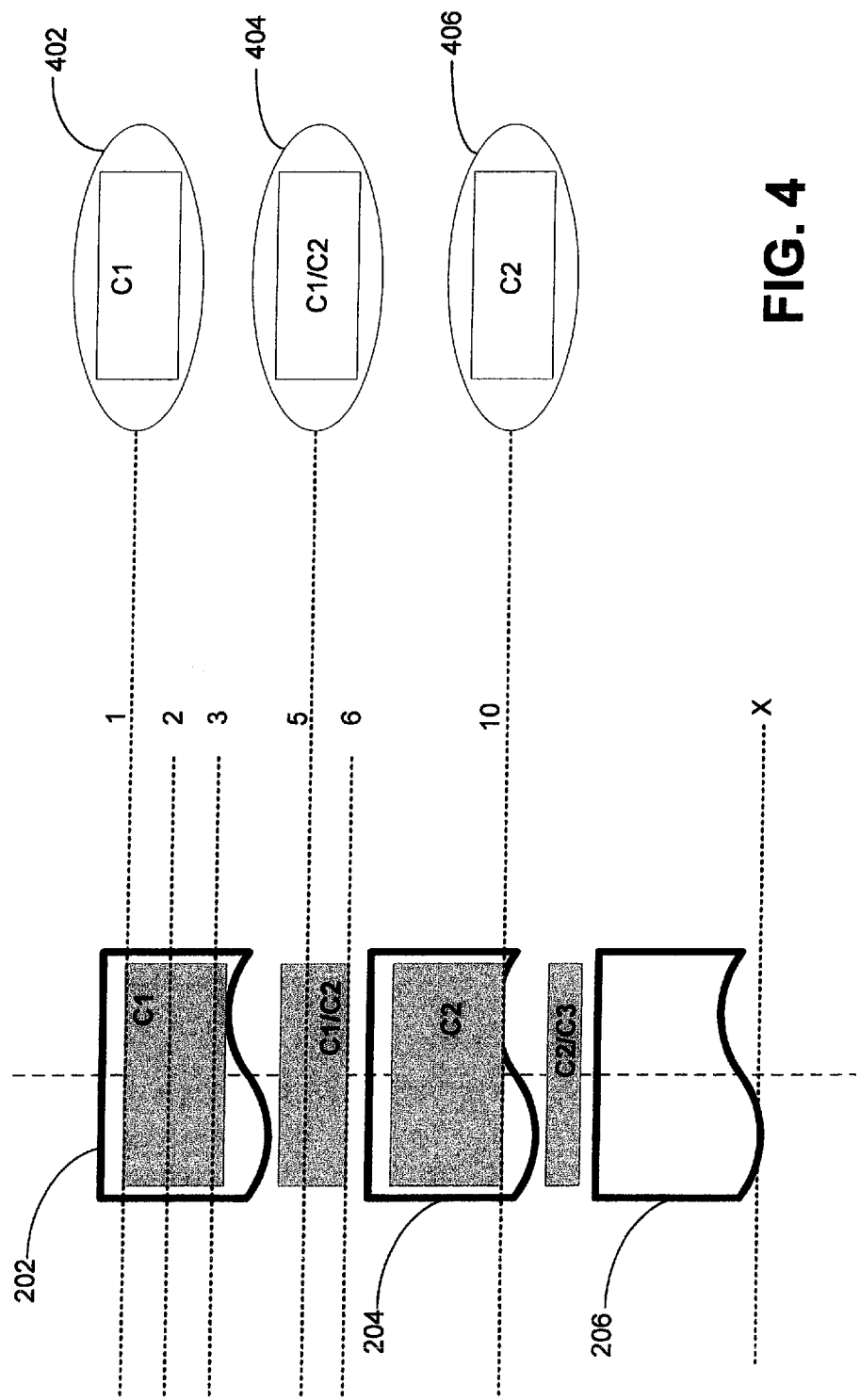
FIG. 4 is a block diagram illustrating image slices taken in the axial plane of the illustrated spine of FIG. 2.

The labels of the present invention are propagated to any desired view including volumetric rendering, such as the transverse or axial slice shown in region C, which displays the x, z area. The displayed axial slice is one of several image slices that span the length of the spinal column shown in sagittal view of region A. To best describe the propagation of labeling to the axial plane view, attention should be directed to the illustrations of FIGS. 2 and 4.

Images of the axial plane and images of the sagittal and coronal planes have an orthogonal spatial relationship to one another. An axial slice image intersects the sagittal and coronal images at a line of intersection. Each labeled region 203, 205, 209 in the sagittal and coronal views represents a volume in the spinal column 201. As such, a perpendicular slice of the spinal column 201, such as indicated by the lines 1 through 10 in the drawing figure, will intersect a labeled region 203, 205, 209, thus providing a label identification of each slice. Consequently, as a user traverses through a series of axial image views, along the spinal axis 212, a label identifier C1, C1/C2, C2, C2/C3, and C3 corresponding to an appropriately labeled volume in the orthogonal sagittal or coronal view is displayed with each axial image.

To further illustrate, consider a first slice 1 and the associated image 402 (image 1 of X) taken in the axial plane of the vertebra 402 of the spinal column 401. Label region C1 is intersected by slice 1 and thus that particular axial image 402 will display "C1". As the user continues to traverse through other slices of the spinal column, corresponding labels are displayed. For example, when the user reaches image 404 (image 5 of X) created by slice 5, the intersection of the axial plane and the sagittal plane occurs within label region C1/C2 as such, the displayed image 404 would show a label of C1/C2. Similarly, when the user traverses through to image 406 (image 10 of X) created by slice 10, a label of C2 is displayed in image 406.

In a further aspect of the present invention, the labeling by a user of two vertebras that are adjacent to an inter-vertebra disc will result in an automatic labeling of that inter-vertebra disc. The converse is also true, meaning that a vertebra that is adjacent to two labeled inter-vertebra discs will be automatically labeled. This feature is one that is configurable by the end user to be enabled or disabled.

Figure 7:
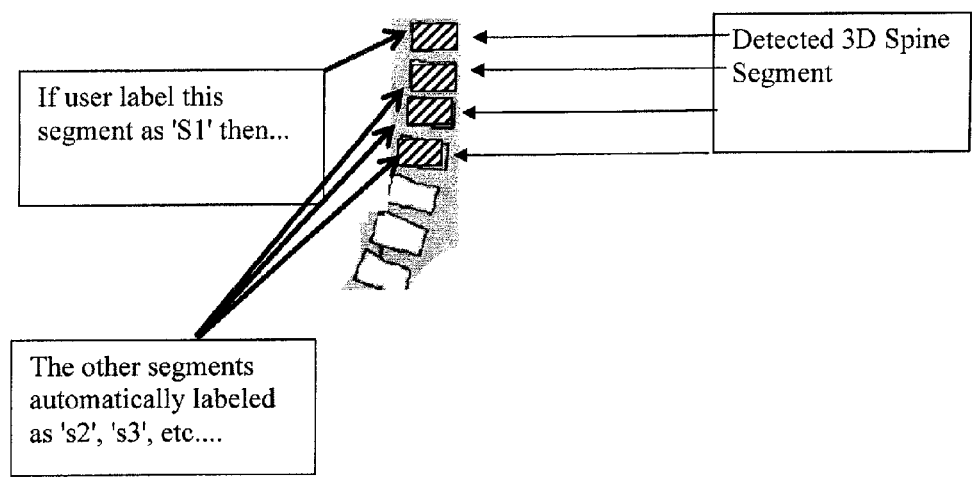
FIG. 7 is an illustrative diagram of a detected spine segments.

In yet another aspect, as best seen in FIG. 7, the present invention may include a method comprising: detecting spine segments with a 3D volumetric data recognition engine, displaying the detected segments overlayed on top of the anatomical image(s), allowing a user to place a label on one of the detected segment area, and automatically populating labels on all the detected segments based on the order of the segments that are aligned.

In an even further aspect of the present invention, a user can provide central points of a vertebra manually. This process may be accomplished utilizing a mouse of other user input device. The user may click at the center portion of a vertebra or draw the curved line passing through the vertebral axis. This step can be performed before or after the manual labeling process that was earlier described. The application program of the present invention utilizes this centering information in much the same fashion as earlier described, i.e. to anchor the manual volume label among other things.

It may be problematic in some instances for a user to indicate the exact location for the placement of labels in the three dimensional volume. The three dimensional volume is typically the x-y location in the axial plane, or the z-y location in the sagittal plane, or z-x location in the coronal plane. The process of placing the labels can be time consuming and require mental concentration for the placement of the mouse cursor in the exact location(s) along the spinal image in order to provide relevant labels. The present invention addresses this issue in a further embodiment that utilizes a spine center line. More specifically, spine detection/segmentation techniques are utilized for locating the user's mouse cursor and the ultimate placement of labels. As best illustrated in FIG. 5A and the spinal diagram 500, the present invention locates the position for the placement of a label by either restricting a user's mouse movement along a system detected spine center line 504 or by implementing an automatic labeling that utilizes the detected spine center results.

A center line spine detection system that may be used in the present invention is described in U.S. Patent Application No. 2009/0202122, filed on Feb. 6, 2009, which is hereby incorporated by reference in its entirety. The present invention is operable in a semi-automatic labeling mode and a fully automatic mode. The semi-automatic mode refers to the above described methodology that utilizes the spine center line detection to restrict mouse pointer movement. In this mode, the basic operation of the inventive system is essentially the same as the earlier described manual operation for spine labeling. The distinction lies in the restriction that is placed on the movement of the mouse pointer 502. As a user moves the mouse pointer 502, the movement is dynamically linked to a spine labeling cursor 506. The labeling cursor 506 is restricted to moving along the detected center line 504 and may also be restricted/snapped to specific point locations on the center line, such that the placement of the label is consistent, easier and faster. In other words the typical erratic motion that may be exhibited by a user or the inaccurate placement of the label cursor away from the spine is eliminated. Furthermore, the time and effort required for a user to "zero-in" to a precise label location is also eliminated.

In operation, the detected center line 504 and the label cursor 506 may be constantly displayed and visible to the user. The visible center line 504 and label cursor 506 indicate where labels would be placed, as the user moves the mouse pointer 502. Once the label cursor 506 has reached a location that is satisfactory to the user, the user may take an action such as clicking the mouse button to anchor a label.

Figure 5B:
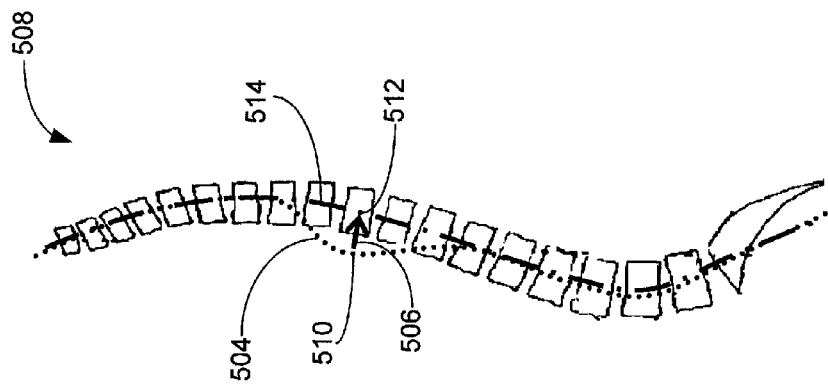
FIG. 5B is an illustrative diagram of a spine column with a detected center line and a corrected center line.
Figure 5A:
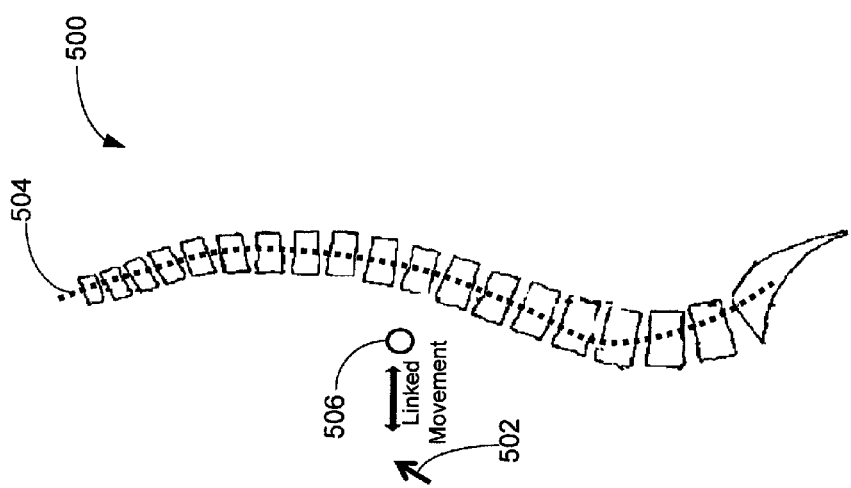
FIG. 5A is an illustrative diagram of a spine column with a detected center line and spine labeling cursor.

In a further embodiment of the present invention, and as best illustrated in the diagram 508 of FIG. 5B, a user may relocate the detected center line 504. In operation, if a user is unsatisfied with the detected center line 504, the user may select and drag one or more individual points along the detected line to a new location, and thus redraw the center line. As shown, the user may place the mouse pointer 506 at a location point 510 along the detected center line 504. When the user drags the mouser pointer 506 to a new location 512, a corrected centerline 514 is then generated. The corrected center line 514 is generated via an interpolation process.

In the automatic mode of operation, automatic segmentation of individual spine structures along with center line detection processes are utilized. In this mode, when a user initializes spine labeling, all the spine labels are automatically identified and placed. The user is able to modify the resulting label placements if desired. The modification of the resulting label placement may be accomplished in a manner consistent with the above described semi-automatic label placement process of the present invention.

Having described the system and method of the present invention and an embodiment thereof, an exemplary computer environment for implementing the described design and execution is presented next.

Figure 6:
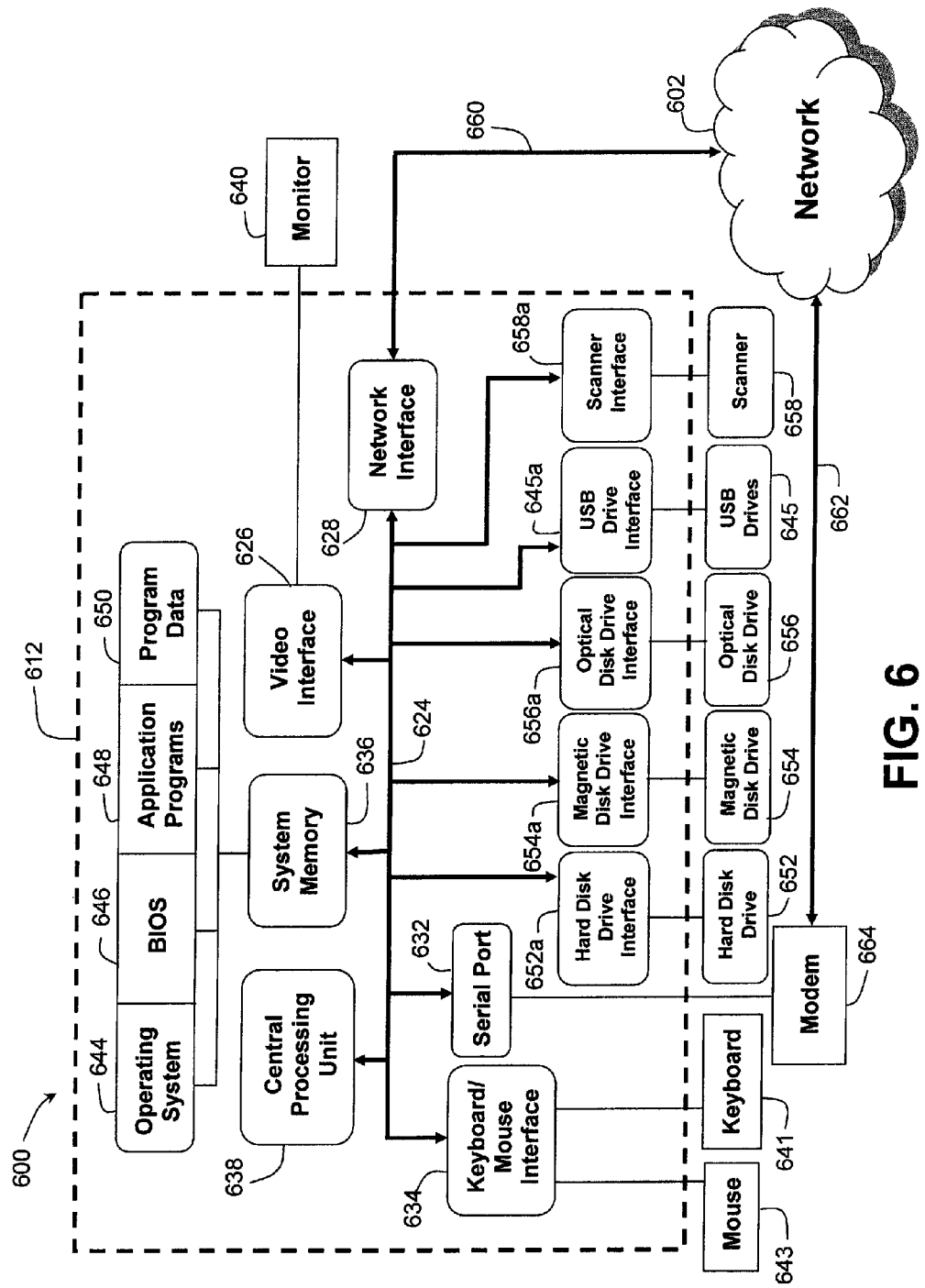
FIG. 6 is a block diagram generally illustrating a computing environment in which the invention may be implemented.

FIG. 6 shows an exemplary computing environment 600 that can be used to implement any of the processing thus far described. The computing environment 600 may comprise a computer 612 including a system bus 624 that couples a video interface 626, network interface 628, one or more serial ports 632, a keyboard/mouse interface 634, and a system memory 636 to a Central Processing Unit (CPU) 638. Computer 612 may also include a Graphics Processing Unit (GPU) or one or more other special or general purpose processing units. A monitor or display 640 is connected to bus 624 by video interface 626 and provides the user with a graphical user interface to view, edit, and otherwise manipulate digital images. The graphical user interface allows the user to enter commands and information into computer 612 using a keyboard 641 and a user interface selection device 643, such as a mouse or other pointing device. Keyboard 641 and user interface selection device are connected to bus 624 through keyboard/mouse interface 634. The display 640 and user interface selection device 643 are used in combination to form the graphical user interface which allows the user to implement at least a portion of the present invention. Other peripheral devices may be connected to remote computer through serial port 632 or universal serial bus (USB) drives 645 to transfer information to and from computer 612. For example, CT scanners, X-ray devices and the like may be connected to computer 612 through serial port 632, USB drives 645, or transferred to the server device using DICOM communication protocol so that data representative of a digitally represented still image or video may be downloaded to system memory 636 or another memory storage device associated with computer 612 to enable processes and functions in accordance with the present invention.

The system memory 636 is also connected to bus 624 and may include read only memory (ROM), random access memory (RAM), an operating system 644, a basic input/output system (BIOS) 646, application programs 648 and program data 650. The computer 612 may further include a Solid State Drive (SSD), a hard disk drive 652 for reading from and writing to a hard disk, a magnetic disk drive 654 for reading from and writing to a removable magnetic disk (e.g., floppy disk), and an optical disk drive 656 for reading from and writing to a removable optical disk (e.g., CD ROM or other optical media). The computer 612 may also include USB drives 645 and other types of drives for reading from and writing to flash memory devices (e.g., compact flash, memory stick/PRO and DUO, SD card, multimedia card, smart media xD card), and a scanner 650 for scanning items such as still image photographs to be downloaded to computer 612. A hard disk interface 652a, magnetic disk drive interface 654a, a optical drive interface 656a, a USB drive interface 645a, and a scanner interface 658a operate to connect bus 624 to hard disk drive 652, magnetic disk drive 654, optical disk drive 656, USB drive 645 and a scanner 658, respectively. Each of these drive components and their associated computer-readable media may provide computer 612 with non-volatile storage of computer-readable instruction, program modules, data structures, application programs, an operating system, and other data for computer 612. In addition, it will be understood that computer 612 may also utilize other types of computer-readable media in addition to those types set forth herein, such as digital video disks, random access memory, read only memory, other types of flash memory cards, magnetic cassettes, and the like.

Computer 612 may operate in a networked environment using logical connections with image capture devices such as MRI, CT scanners, Ultrasound, Positron Emission Tomography (PET) or X-Ray devices. Network interface 628 provides a communication path 660 between bus 624 and network 620, which allows images to be communicated through network 620 from any of the previously identified imaging devices, and optionally saved in a memory, to computer 612. This type of logical network connection is commonly used in conjunction with a local area network (LAN). Images may also be communicated from bus 624 through a communication path 662 to network 620 using serial port 632 and a modem 664. Using a modem connection between computer 612 and imaging devices may be used in conjunction with a wide area network (WAN) or the Internet. It will be appreciated that the network connections shown herein are merely exemplary, and it is within the scope of the present invention to use other types of network connections between computer 612 and imaging devices including both wired and wireless connections.

From the foregoing, it will be seen that this invention is one well adapted to attain all the ends and objects hereinabove set forth together with other advantages which are obvious and which are inherent to the method and apparatus. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. A method programmed for execution in a computing device for labeling two or more digital image views of an anatomical object, the method comprising:
   providing a volumetric object(s) for the anatomical object visible in any of the two or more digital image views;
   locating said volumetric object(s) to the center or clinically appropriate location of the anatomical object;
   utilizing said volumetric object(s) to identify and label the anatomical object in all spatially related digital image views that intersect with the volumetric object; and
   utilizing the location of said volumetric object(s) to streamline the labeling process by predicting subsequent logical label name(s) based on the direction of movement and location of a cursor with respect to other regions of the anatomical object,
   wherein said cursor is controlled by a user via a pointing device.

2. A method in accordance with claim 1 wherein said label volumetric object(s) is overlayed on said views of the anatomical object.

3. A method in accordance with claim 2 wherein the anatomical object is a spine.

4. A method in accordance with claim 3 wherein said volumetric object(s) identifies is a vertebra or inter-vertebra.

5. A method in accordance with claim 4 wherein said volumetric object(s) is centered on said vertebra or inter-vertebra and said volumetric object(s) is dimensioned to approximate outer boundaries of said vertebra or inter-vertebra, wherein said spine may be linearized for streamlining the labeling process and a well defined volume of the vertebra or inter-vertebra is ascertained and identified by a label.

6. A method in accordance with claim 5 wherein an axis of the spine is located and utilized to align and anchor said volumetric object across the two or more digital image views.

7. A method in accordance with claim 5 wherein a first one of the two or more digital image views is on a sagittal plane and a second one of the two or more digital image views is an axial slice that is perpendicular to said first one of the two or more digital image views, and wherein there are continuous label displays in said second digital image view as one traverses slices of the spine along the plane of said first digital image view and thus through said volumetric object.

8. A method in accordance with claim 4 wherein a user may elect to label or not label said inter-vertebra volume.

9. A method in accordance with claim 4 wherein labeling two adjacent vertebra results in an automated labeling of the intervening inter-vertebra by determining the intervening label name and location utilizing said volumetric object.

10. A method in accordance with claim 4 further comprising automated labeling of vertebral and inter-vertebral regions when a user provides labels for two adjacent inter-vertebral or vertebral regions.

11. A method in accordance with claim 3 wherein a plurality of spine segments are detected with a 3D volumetric data recognition engine, wherein said detected segments further define a volumetric object(s) that is overlayed on top of an image of said spine, wherein a user may label one or more of said detected segments; and utilizing said volumetric object(s) to provide labels on the remainder of said detected segments to thereby streamline the labeling process.

12. A method in accordance with claim 1 wherein the two or more digital image views are orthogonal views.

13. A method in accordance with claim 1 wherein said volumetric object is provided by having a user manipulate a pointing device, said pointing device being dynamically linked to a labeling cursor, said labeling cursor restricted to predetermined positions along a detected center line of the volumetric object.

14. A method in accordance with claim 13, wherein said detected center line of the anatomical object may be relocated by said user by utilizing said pointing device to drag a point along said detected center line of the anatomical object to a new location, wherein a corrected center line may be provided and the related volumetric object may be aligned.

15. A method in accordance with claim 1 wherein the label is provided to identify a curved planar reformatted image (CPR).

* * * * *